(12) United States Patent
Torin et al.

(10) Patent No.: US 8,179,305 B2
(45) Date of Patent: May 15, 2012

(54) ENHANCED IMPULSE RESPONSE MEASUREMENT OF AN FM RADAR TRANSMITTER PULSE

(75) Inventors: Shigetsune Torin, Beaverton, OR (US); Thomas C. Hill, III, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 436 days.

(21) Appl. No.: 12/570,964

(22) Filed: Sep. 30, 2009

(65) Prior Publication Data
US 2011/0037643 A1 Feb. 17, 2011

Related U.S. Application Data

(60) Provisional application No. 61/233,435, filed on Aug. 12, 2009.

(51) Int. Cl.
*G01S 7/40* (2006.01)
(52) U.S. Cl. .................. 342/174; 342/173; 342/195
(58) Field of Classification Search ............ 342/174
See application file for complete search history.

(56) References Cited

U.S. PATENT DOCUMENTS 5,036,328 A * 7/1991 Nakamura et al. .......... 342/204
5,450,849 A * 9/1995 Ueda ............................ 600/443

OTHER PUBLICATIONS

"Advanced Radar Analysis; Tools for Measuring Modern Radars." Tektronix. Jan. 2009. 28 pages.*
Analyzing Infiniium Scope Radar Waveforms with Advanced Design System, Connected Solutions, Application Bulletin 1476-2, Agilent Technologies, Inc., Printed in USA, Dec. 2, 2003, 5989-0127EN, available at http://cp.literature.agilent.com/litweb/pdf/5989-0127EN.pdf (accessed on Oct. 12, 2009).

* cited by examiner

*Primary Examiner* — Thomas Tarcza
*Assistant Examiner* — Matthew M Barker
(74) *Attorney, Agent, or Firm* — Michael A. Nelson

(57) ABSTRACT

An enhanced impulse response measurement for a pulsed frequency modulation (FM) radar signal provides a more accurate measurement of the amplitude of a secondary response relative to the amplitude of a main response. The pulsed FM radar signal is sampled to produce a time-domain sample record. The sample record is windowed to produce a windowed sample record. The windowed sample record is transformed into a frequency-domain spectrum. The spectrum is multiplied with the complex conjugate of a frequency-domain estimate of a transmitted pulsed FM radar signal to produce a de-spreaded pulse. The de-spreaded pulse is transformed into the time domain to produce a measurement of the impulse response having a main response and a secondary response. The amplitude of the secondary response is corrected to eliminate errors caused by the windowing.

18 Claims, 8 Drawing Sheets

ENHANCED IMPULSE RESPONSE MEASUREMENT OF AN FM RADAR TRANSMITTER PULSE

CROSS REFERENCE TO RELATED APPLICATIONS

This application claims the benefit of U.S. Provisional Application No. 61/233,435, filed Aug. 12, 2009.

FIELD OF THE INVENTION

The present invention relates to an impulse response measurement for a pulsed frequency modulation (FM) radar signal, and more particularly to an enhanced impulse response measurement that provides a more accurate measurement of the amplitude of a secondary response relative to the amplitude of the main response.

BACKGROUND OF THE INVENTION

Pulsed FM radar is a form of radar that detects targets using a pulsed frequency modulated signal. The use of a pulsed frequency modulated signal provides better range resolution and signal-to-noise ratio than other types of signals. Various types of pulsed frequency modulated signals may be used such as a pulsed linear chirp signal (a pulsed sinusoidal signal having a frequency that changes linearly with time), a pulsed non-linear chirp signal (a pulsed sinusoidal signal having a frequency that changes non-linearly with time), and a pulsed phase-coded signal (a pulsed sinusoidal signal that is phase-modulated in accordance with a binary code).

A pulsed FM radar receiver extracts information about a target from a received pulsed FM radar signal by passing the signal through a matched filter. A matched filter is commonly implemented in the frequency-domain by transforming samples of the received pulsed FM radar signal into a frequency domain spectrum, multiplying the spectrum with the complex conjugate of a frequency-domain estimate of the transmitted pulsed FM radar signal, and transforming the result back into the time-domain. This process "de-spreads" or "compresses" the received pulsed FM radar signal into a narrow pulse, and for this reason it is referred to as "pulse compression." For more information on pulse compression see section 5.3 of "Simulations for Radar Systems Design" by Bassem R. Mahafza and Atef Z. Elsherbeni, Champman & Hall/CRC Press, 2003.

An "impulse response" of a pulsed FM radar transmitter, also referred to as the "point spread function," is an important quality measurement. The impulse response is the brightness pattern of an image produced after pulse compression from a pulsed FM radar signal that is received directly from a pulsed FM radar transmitter or reflected from a very small point target. A good impulse response has a large value corresponding to the location of a target and small values for all surrounding locations. In other words, the impulse response describes the spatial resolution of a pulsed FM radar system.

A common impairment of an impulse response is a secondary or "ghost" response. A ghost response is created when a pulsed FM radar transmitter transmits not only an intended or "main" signal but also a "ghost" signal, that is, a copy of the main signal that is lower in amplitude than the main signal and delayed relative to it. A ghost signal is commonly caused by a low-level internal reflection within the pulsed FM radar transmitter. After pulse compression, the ghost signal results in a fictitious pulse at a location not corresponding to a target referred to as a ghost pulse or ghost response. A ghost pulse can interfere with the proper operation of a radar system by giving a false indication of a second target when one is not present, or alternatively, by obscuring the reflection of a second target when one is present. For these reasons, it is important to accurately characterize the impulse response of a pulsed FM radar transmitter and calibrate the corresponding pulsed FM radar receiver accordingly.

Test and measurement instruments including real-time spectrum analyzers such as the RSA6000 Spectrum Analyzer Series and real-time oscilloscopes such as the DPO/DSA70000B Digital Phosphor Oscilloscope Series, both of which are available from Tektronix, Inc. of Beaverton, Oreg., can be used to measure the impulse response of a pulsed FM radar signal. These test and measurement instruments acquire samples of the pulsed FM radar signal using an acquisition system, perform pulse compression on the acquired samples using software or digital signal processing circuitry, and present a visual image of the resulting impulse response on a display. However, before performing pulse compression, these test and measurement instruments must first apply a window function to the acquired samples in order to avoid truncating the pulsed FM radar signal and thereby generating side-lobes in the frequency domain, an effect referred to as "spectral leakage." The window function is centered about the main signal and thus attenuates the main signal properly. However, if the pulsed FM radar signal includes a ghost signal, then because the ghost signal is delayed relative to the main signal, the ghost signal is not located within the center of the window function but is rather located within a portion of the window function having reduced amplitude, and thus the window function truncates the ghost signal. This truncation of the ghost signal, after pulse compression, causes these test and measurement instruments to inaccurately report the amplitude of the ghost pulse relative to the amplitude of the main pulse.

What is desired is a method of measuring the impulse response of a pulsed FM radar signal that provides a more accurate measurement of the amplitude of a secondary response relative to the amplitude a main response.

SUMMARY OF THE INVENTION

Accordingly, embodiments of the present invention provide an enhanced method of measuring the impulse response of a pulsed FM radar signal that provides a more accurate measurement of the amplitude of a secondary response relative to the amplitude a main response. A pulsed FM radar signal is sampled to produce a time-domain sample record. The sample record is windowed to produce a windowed sample record. The windowed sample record is transformed into a frequency-domain spectrum. The spectrum is multiplied with the complex conjugate of a frequency-domain estimate of a transmitted pulsed FM radar signal to produce a de-spreaded pulse. The de-spreaded pulse is transformed into the time domain to produce a measurement of the impulse response having a main response and a secondary response. The amplitude of the secondary response is corrected to eliminate errors caused by the windowing.

The objects, advantages, and other novel features of the present invention are apparent from the following detailed description when read in conjunction with the appended claims and attached drawings.

DETAILED DESCRIPTION OF THE INVENTION

To aid understanding, the source of the inaccuracy in the measurement of the amplitude of the secondary response is now discussed in more detail.

Figure 1:
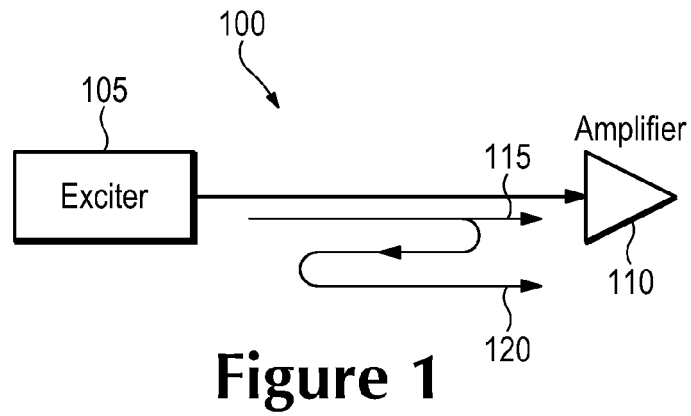
FIG. 1 illustrates how impedance discontinuities or other imperfections can cause a pulsed FM radar transmitter to produce a ghost signal.

A secondary or ghost signal is a copy of a main signal that is lower in amplitude than the main signal and delayed relative to it. A ghost signal is commonly caused by a low-level internal reflection within a pulsed FM radar transmitter. For example, as shown in FIG. 1, impedance discontinuities or other imperfections within a radar transmitter 100 cause a portion of a main signal 115 transmitted from a radar exciter 105 to reflect back from an amplifier 110 to the radar exciter 105 and then back to the amplifier 110. Thus, with each main signal 115, the transmitter 100 also transmits a ghost signal 120, lower in amplitude than the main signal 115 and delayed relative to it.

Figure 2:
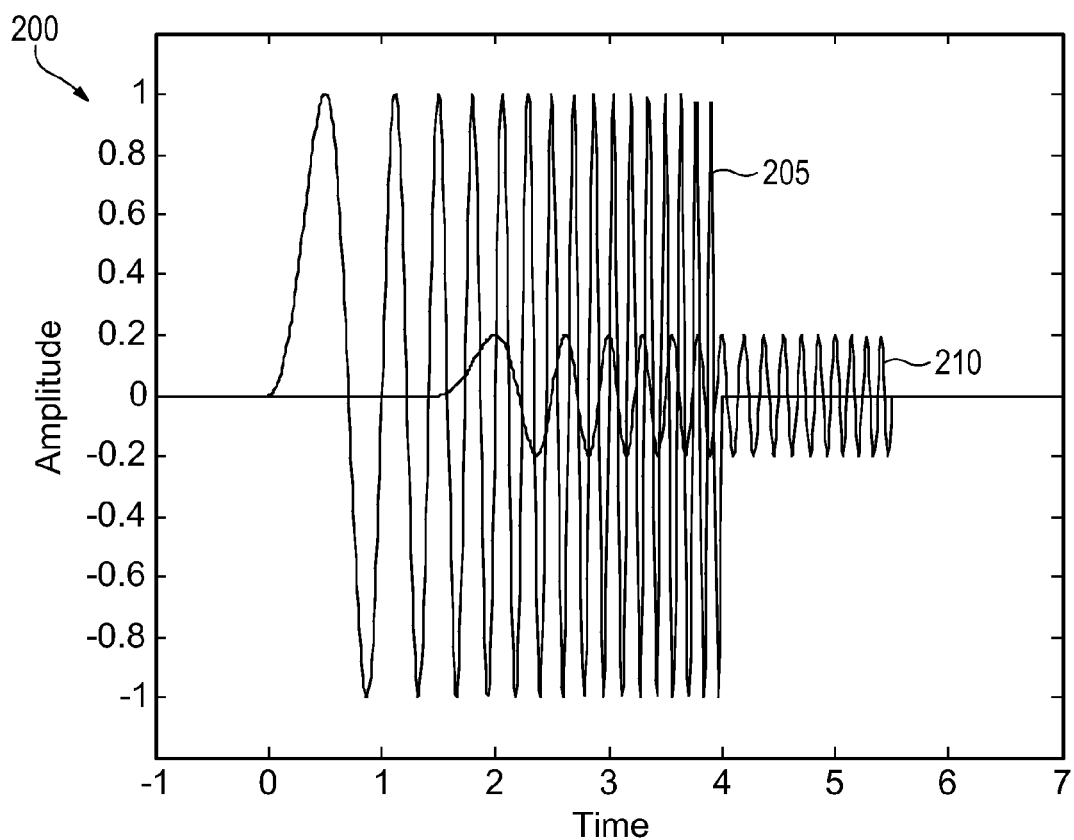
FIG. 2 depicts a pulsed FM radar signal having a low-level reflection.

In FIG. 2, the main signal 115 and secondary signal 120 of FIG. 1 are depicted as pulsed linear chirp signals 205 and 210 respectively. The ghost signal 210 is lower in amplitude than the main signal 205 and is delayed relative to it by 1.6/4=40% of the length of the main signal 205. Note that while the main signal and ghost signal are depicted as pulsed linear chirp signals, the principles discussed in the following discussion are also applicable to other types of pulsed frequency modulated signals such as pulsed non-linear chirp signals and pulsed phase-coded signals.

Figure 3:
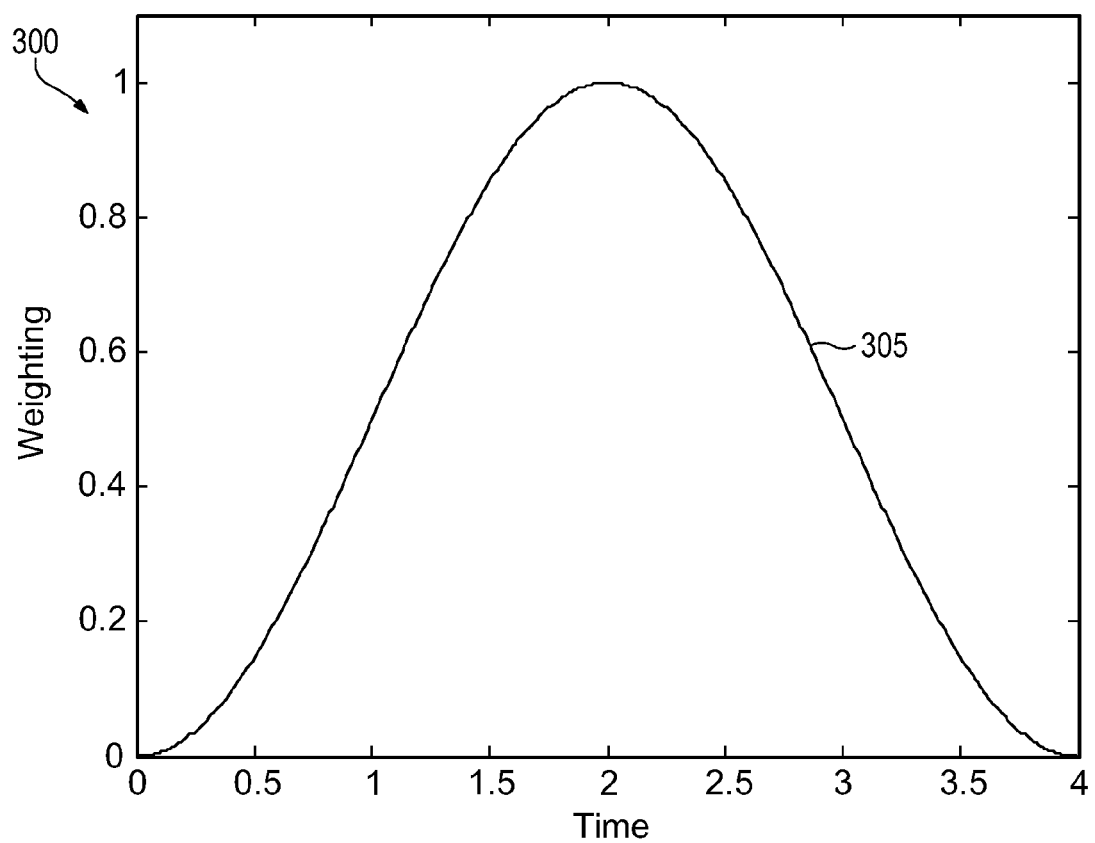
FIG. 3 illustrates a window function.

FIG. 3 shows a window function 305. The window function 305 is centered about the main signal 205, that is, both the window function 305 and the main signal 205 are centered at Time=2.

Figure 4:
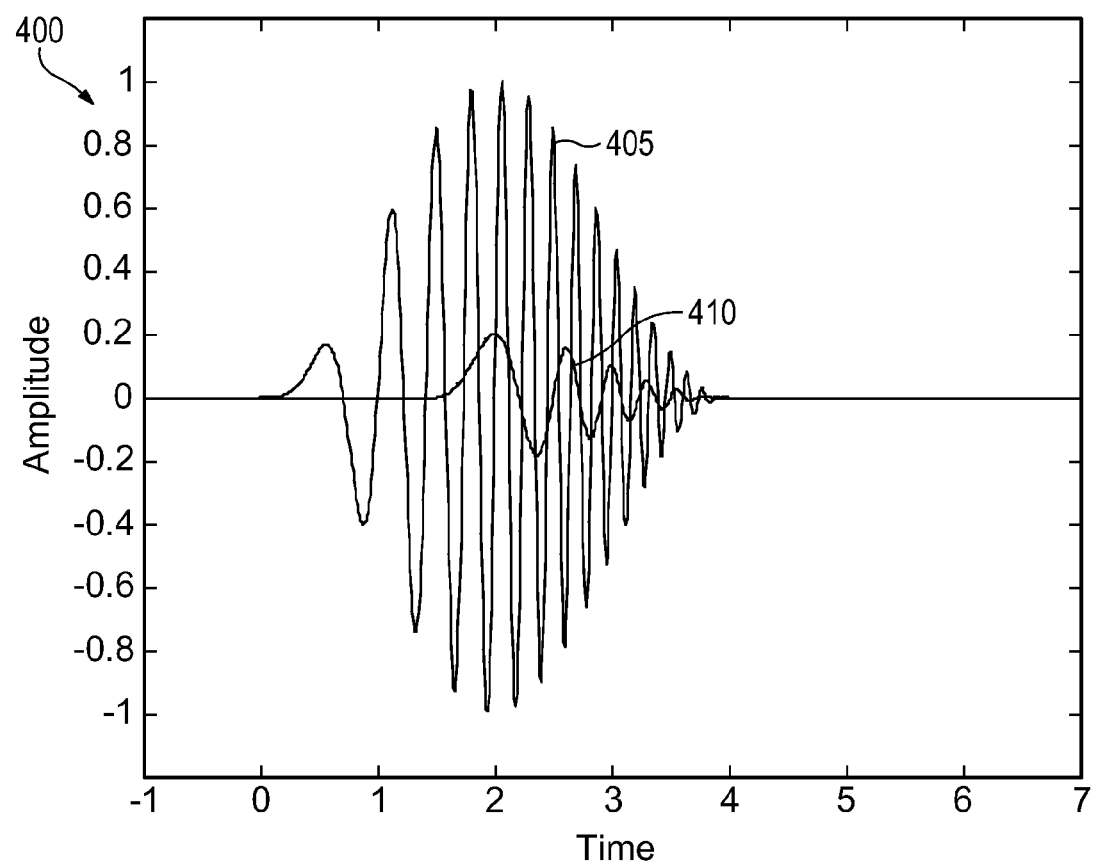
FIG. 4 illustrates the pulsed FM radar signal of FIG. 2 after the application of the window function of FIG. 3.

FIG. 4 illustrates the affect of window function 305 on the pulsed FM radar signal 200. Since the window function 305 is centered about the main signal 205, the window function 305 attenuates the main signal 205 properly as shown in main signal 405. However, since the ghost signal 210 is delayed relative to the main signal 205, the ghost signal 210 is not located within the center of the window function 305 but is rather located within a portion of the window function 305 having reduced amplitude, and thus the window function 305 truncates the trailing portion of the ghost signal 210, that is, the portion of the ghost signal 210 after Time=4, as shown in ghost signal 410.

Figure 5:
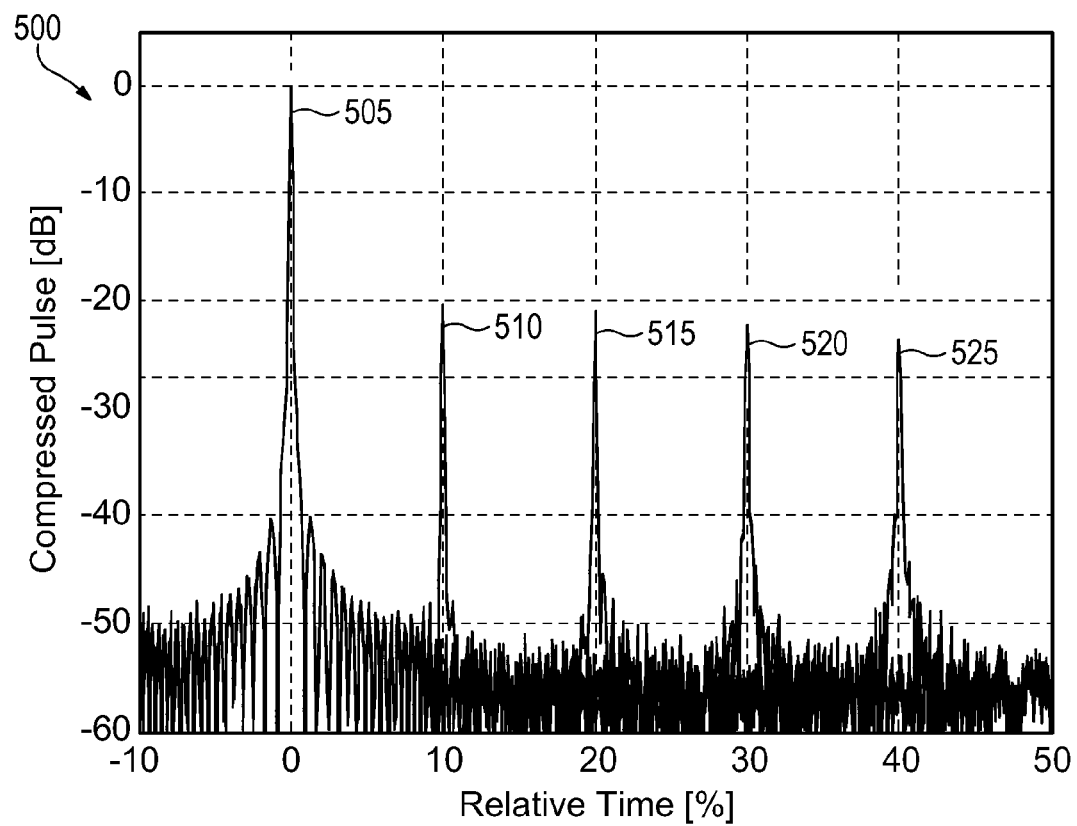
FIG. 5 depicts an impulse response measurement produced using a conventional pulsed FM radar receiver.

FIG. 5 illustrates the effect of this truncation of a ghost signal after pulse compression. An impulse response measurement 500 has a main pulse 505 and ghost pulses 510, 515, 520, and 525 which are delayed by 10%, 20%, 30%, and 40% of the length of the main signal respectively. The amplitudes of each of the ghost signals should be reported to be −20 dB of the main signal, however because of the truncation effect discussed above, the amplitudes are reported inaccurately, with the amplitude error increasing with increasing delay. For example, for when the ghost signal is delayed by 10% of the length of the main signal as shown in ghost pulse 510, the amplitude is reported to be about −20 dB. However, when the ghost signal is delayed by 40% of the length of the main signal as shown in ghost pulse 525, the amplitude is reported to be about −23 dB, or about 3 dB too low. The error due to the truncated ghost signal is about 1.3 dB, and other errors bring the total to about 3 dB.

Figure 6:
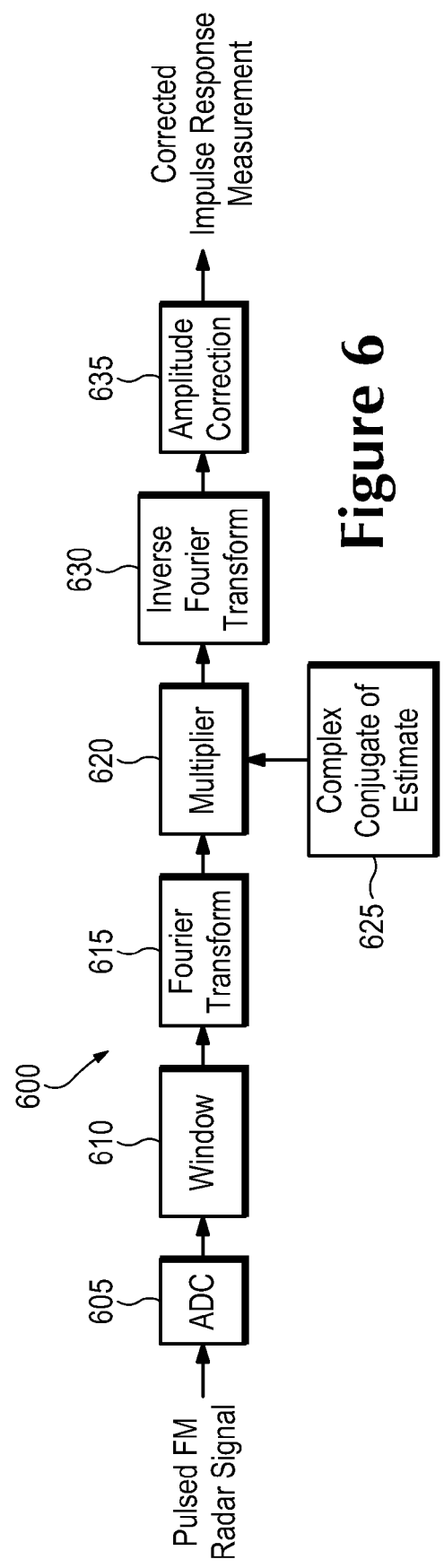
FIG. 6 depicts a simplified, high-level block diagram of a pulsed FM radar receiver according to an embodiment of the present invention.

FIG. 6 shows a pulsed FM radar receiver 600 according to an embodiment of the present invention that provides a more accurate measurement of the amplitude of a secondary response relative to the amplitude of a main response. An analog-to-digital converter 605 samples a pulsed FM radar signal to produce a time-domain sample record. A window function 610 windows the sample record to produce a windowed sample record. The window function 610 may be any form of window function including but not limited to a Taylor window, a Kaiser window, a Blackman-Harris window, or a Hamming window. A discrete Fourier transform 615 transforms the windowed sample record into a frequency-domain spectrum. A multiplier 620 multiplies the spectrum with the complex conjugate of a frequency-domain estimate of the transmitted pulsed FM radar signal 625, that is, the pulsed FM radar signal that was expected to have been transmitted, to produce a de-spreaded pulse. The estimate of the transmitted pulsed FM radar signal may be derived from the received pulsed FM radar signal or it may be generated based on user-specified parameters. An inverse discrete Fourier transform 630 transforms the de-spreaded pulse into the time domain to produce a measurement of the impulse response of the pulsed FM radar signal having a main response and a secondary response. An amplitude correction 635 calculates an amplitude correction factor and uses it to correct the amplitude of the secondary response to eliminate errors caused by the window function 610.

Figure 7:
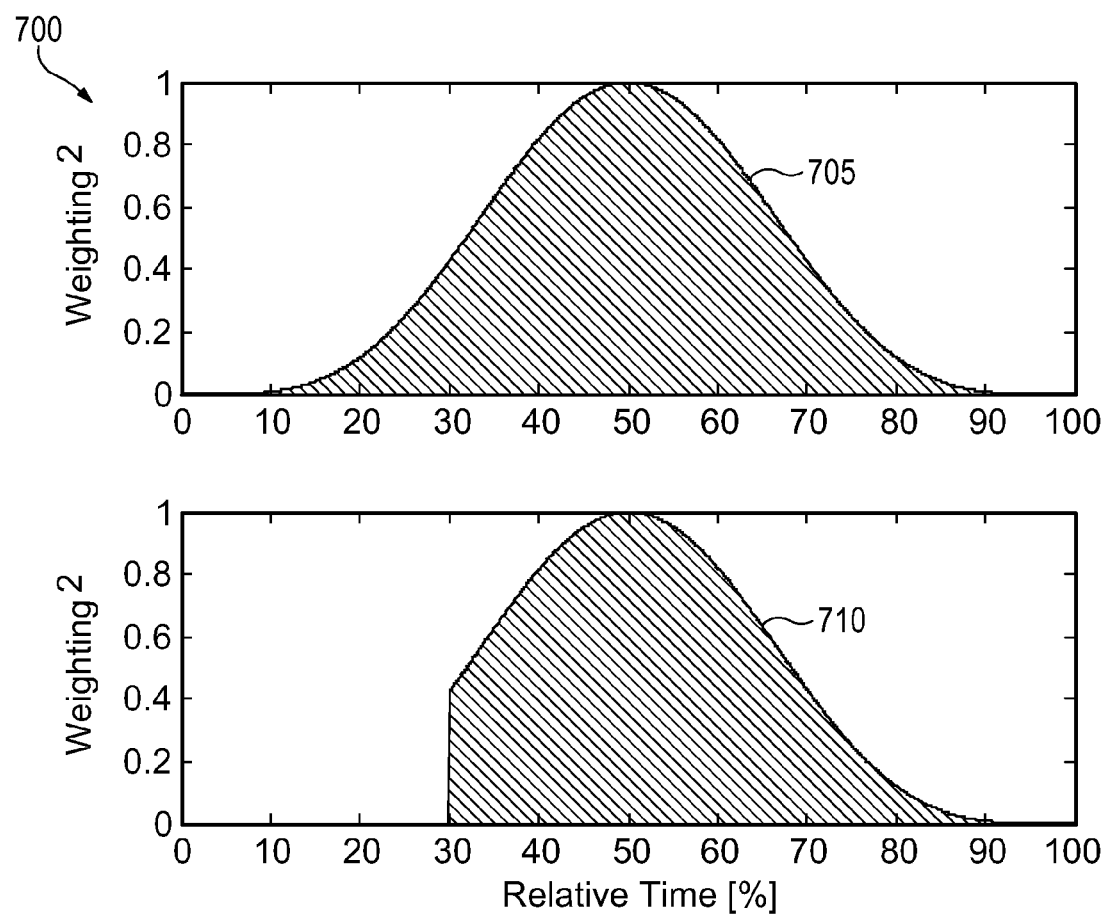
FIG. 7 illustrates the power weightings of a main signal and a ghost signal.
Figure 8:
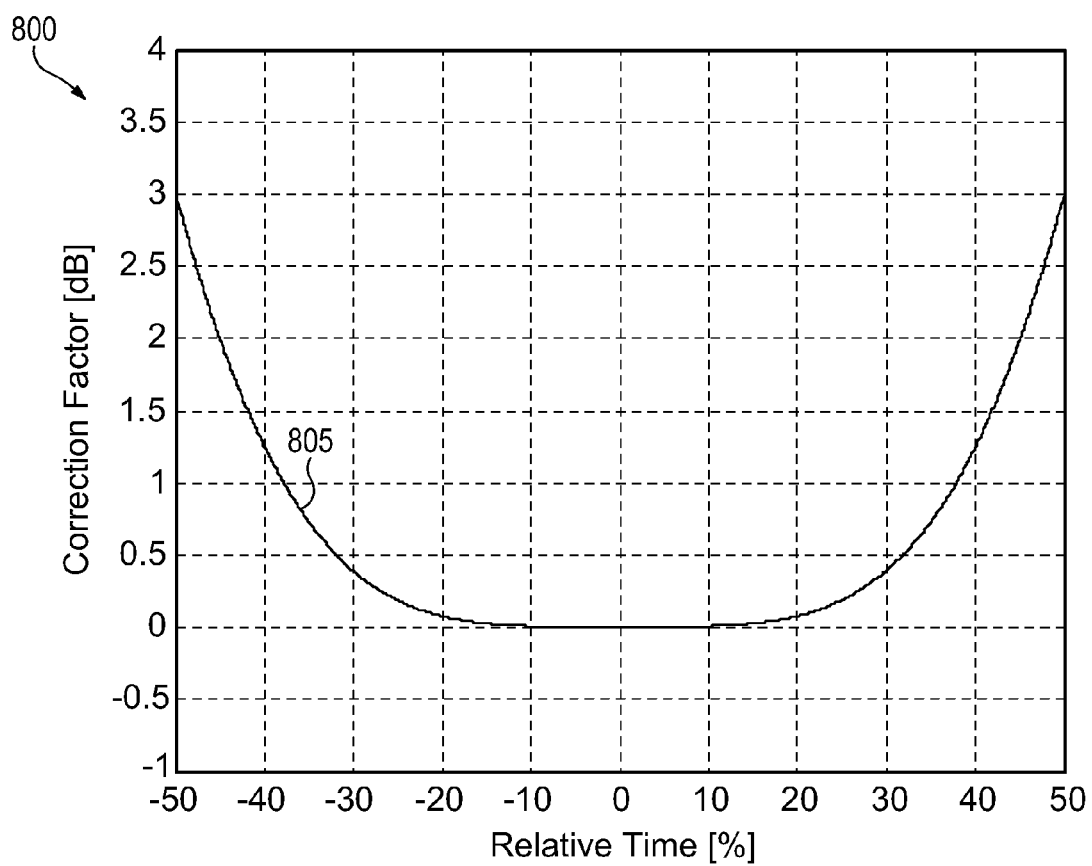
FIG. 8 depicts amplitude correction factors for various ghost signal delays.

The calculation of an amplitude correction factor for a ghost signal having a particular delay value is illustrated by the following example: FIG. 7 shows a power weighting of a main signal 705 and a power weighting of a ghost signal 710 that is delayed by 40% of the length of the main signal. A "power weighting" describes the distribution of signal power that results from the application of the window function 305 to a signal. The power weighting of the ghost signal 710 is similar to the power weighting of the main signal 705 except that it is truncated by 40% due to the fact that the ghost signal is delayed by 40% of the length of the main signal. The amplitude correction factor is equal to the ratio of the integral (that is, the area under the curve) of the power weighting of the main signal 705 to the integral of the power weighting of the ghost signal 710, or in this example, about 1.3 dB. The integral of a power weighting is equivalent to the energy of the signal. Thus, the amplitude correction factor is equal to the ratio of the energy of the main signal to the energy of the ghost signal. FIG. 8 shows amplitude correction factors 805 for ghost signals having various other delay values.

Figure 9:
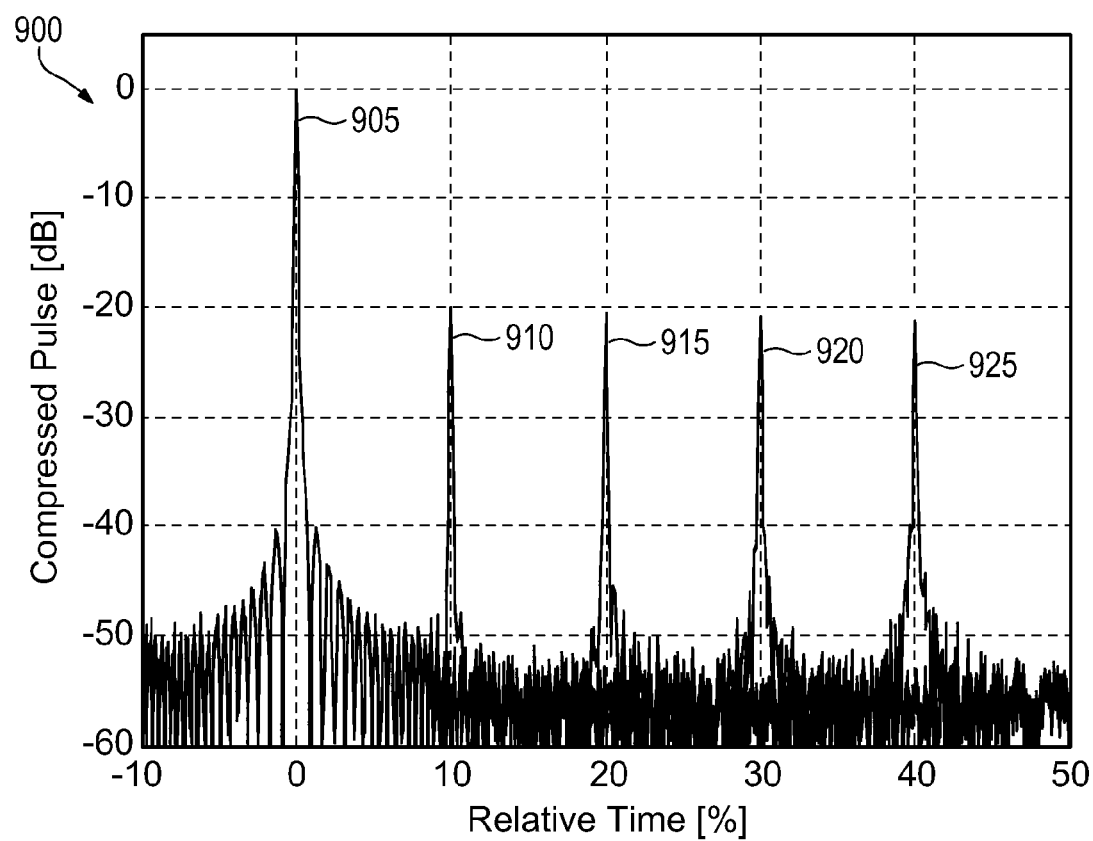
FIG. 9 depicts an impulse response measurement produced using the pulsed FM radar receiver of FIG. 6.

In one embodiment of the present invention, a user-selected portion of an impulse response measurement, for example, the peak value of a ghost pulse, is corrected. In an alternative embodiment, every portion of an impulse response measurement is corrected to produce a fully amplitude corrected impulse response measurement 900 as shown in FIG. 9. Note that in comparison to the uncorrected ghost pulses 510, 515, 520, and 525 which exhibit a large amplitude error, ghost pulses 910, 915, 920, and 925 have amplitudes that are much closer to −20 dB. Also note that according to FIG. 8, the amplitude correction factor at zero delay, that is, the location of the main pulse, is 0 dB. Thus, correcting every portion of an impulse response measurement has no effect on the main response, only the secondary response.

Although the embodiments of the present invention described above use a discrete Fourier transform to transform the windowed sample record into a frequency-domain spectrum, various other embodiments may use other transforms such as a Hartley transform or a chirp-Z transform.

It will be appreciated from the foregoing discussion that the present invention represents a significant advance in the measurement of an impulse response of a pulsed FM radar signal. Although a specific embodiment of the invention has been illustrated and described for purposes of illustration, it will be understood that various modifications may be made without departing from the spirit and scope of the invention. Accordingly, the invention should not be limited except as by the appended claims.

What is claimed is:

1. A method of measuring an impulse response of a pulsed frequency or phase modulated radar signal, the radar signal including a secondary signal and a main signal, the secondary signal being a copy of the main signal, being lower in amplitude than the main signal, and being delayed relative to the main signal, the method comprising the steps of:
   sampling the pulsed frequency or phase modulated radar signal to produce a time-domain sample record;
   windowing the sample record to produce a windowed sample record;
   transforming the windowed sample record into a frequency-domain spectrum;
   multiplying the spectrum with a complex conjugate of a frequency-domain estimate of a transmitted pulsed frequency or phase modulated radar signal to produce a de-spreaded pulse;
   transforming the de-spreaded pulse into a time-domain measurement of the impulse response; and
   correcting an amplitude of the measurement of the impulse response using a correction factor that is a function of the delay of the secondary signal relative to the main signal.

2. The method of claim 1 wherein the correcting step comprises the steps of:
   calculating an energy of the main signal;
   calculating an energy of the secondary signal;
   calculating a ratio of the energy of the main signal to the energy of the secondary signal; and
   correcting the amplitude of the measurement of the impulse response based on the ratio.

3. The method of claim 1 wherein the correcting step comprises the step of correcting a user-selected portion of the measurement of the impulse response.

4. The method of claim 1 wherein the correcting step comprises the step of correcting every portion of the measurement of the impulse response.

5. The method of claim 1 wherein the windowing step comprises the step of windowing the sample record with a window function selected from the group consisting of a Taylor window, a Kaiser window, a Blackman-Harris window, and a Hamming window.

6. The method of claim 1 wherein the step of transforming the windowed sample record into a frequency-domain spectrum comprises the step of transforming the windowed sample record into a frequency-domain spectrum with a transform selected from the group consisting of a discrete Fourier transform, a Hartley transform, and a chirp-Z transform.

7. The method of claim 1 wherein the pulsed frequency modulated radar signal comprises a signal selected from the group consisting of a pulsed linear chirp signal, a pulsed non-linear chirp signal, and a pulsed phase-coded signal.

8. A test and measurement instrument adapted to perform the method of claim 1.

9. The test and measurement instrument of claim 8 wherein the test and measurement instrument is selected from the group consisting of a real-time spectrum analyzer and a real-time oscilloscope.

10. The method of claim 1 further comprising the step of calibrating a pulsed frequency or phase modulation radar receiver based on the corrected measurement of the impulse response.

11. The method of claim 1 further comprising the step of displaying the measurement of the impulse response.

12. An apparatus comprising digital signal processing circuitry, the circuitry including:
   an analog-to-digital converter for sampling a pulsed frequency or phase modulated radar signal to produce a time-domain sample record, the radar signal including a secondary signal and a main signal, the secondary signal being a copy of the main signal, being lower in amplitude than the main signal, and being delayed relative to the main signal;
   a window function for windowing the sample record to produce a windowed sample record;
   a time-to-frequency transform for transforming the windowed sample record into a frequency-domain spectrum;
   a multiplier for multiplying the spectrum with a complex conjugate of a frequency-domain estimate of a transmitted pulsed frequency or phase modulated radar signal to produce a de-spreaded pulse;
   a frequency-to-time transform for transforming the de-spreaded pulse into a time-domain measurement of an impulse response of the radar signal; and
   an amplitude correction for correcting an amplitude of the measurement of the impulse response based on an amplitude correction factor that is a function of the delay of the secondary signal relative to the main signal.

13. The apparatus of claim 12 wherein the amplitude correction factor comprises a ratio of an energy of a main signal to an energy of a secondary signal.

14. The apparatus of claim 12 wherein the amplitude correction corrects a user-selected portion of the measurement of the impulse response.

15. The apparatus of claim 12 wherein the amplitude correction corrects every portion of the measurement of the impulse response.

16. The apparatus of claim 12 wherein the window function is a window function selected from the group consisting of a Taylor window, a Kaiser window, a Blackman-Harris window, and a Hamming window.

17. The apparatus of claim 12 wherein the time-to-frequency transform is selected from the group consisting of a discrete Fourier transform, a Hartley transform, and a chirp-Z transform.

18. The apparatus of claim 12 wherein the pulsed frequency modulated radar signal comprises a signal selected from the group consisting of a pulsed linear chirp signal, a pulsed non-linear chirp signal, and a pulsed phase-coded signal.

* * * * *